United States Patent
Gogna et al.

(10) Patent No.: US 12,151,590 B2
(45) Date of Patent: Nov. 26, 2024

(54) PREDICTIVE FUEL CELL RESTART DURING LOW SPEED OPERATION

(71) Applicant: FORD GLOBAL TECHNOLOGIES, LLC, Dearborn, MI (US)

(72) Inventors: Naginder Gogna, Northville, MI (US); Jason Meyer, Canton, MI (US); Rajit Johri, San Francisco, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 99 days.

(21) Appl. No.: 18/171,715

(22) Filed: Feb. 21, 2023

(65) Prior Publication Data
US 2023/0264604 A1  Aug. 24, 2023

Related U.S. Application Data

(60) Provisional application No. 63/312,338, filed on Feb. 21, 2022.

(51) Int. Cl.
*B60L 58/30* (2019.01)
*H01M 8/04858* (2016.01)

(52) U.S. Cl.
CPC .......... *B60L 58/30* (2019.02); *H01M 8/04925* (2013.01); *B60L 2240/12* (2013.01); *B60L 2240/68* (2013.01); *H01M 2250/20* (2013.01)

(58) Field of Classification Search
CPC ...... B60L 58/30; B60L 58/40; B60L 2240/68; H01M 2250/20
USPC ......................................................... 307/9.1
See application file for complete search history.

(56) References Cited

U.S. PATENT DOCUMENTS

2020/0391615 A1\* 12/2020 Beck .................. H01M 16/006

\* cited by examiner

*Primary Examiner* — Daniel Kessie
*Assistant Examiner* — Dru M Parries
(74) *Attorney, Agent, or Firm* — David B. Kelley; Brooks Kushman P.C.

(57) ABSTRACT

A fuel cell electric vehicle is powered by a fuel cell that converts hydrogen gas into electricity to power the vehicle's electric motor. The fuel cell drivetrain includes the fuel cell, traction battery, vehicle controller, and other components. The vehicle controller, also known as an electronic control unit, manages and controls various functions of the vehicle, such as the fuel cell system, engine, and traction battery. It makes decisions based on data from sensors and inputs and optimizes fuel efficiency.

14 Claims, 2 Drawing Sheets

PREDICTIVE FUEL CELL RESTART DURING LOW SPEED OPERATION

CROSS-REFERENCE TO RELATED APPLICATIONS

This application claims the benefit of U.S. provisional application Ser. No. 63/312,338 filed Feb. 21, 2022, the disclosure of which is hereby incorporated in its entirety by reference herein.

TECHNICAL FIELD

This disclosure relates to vehicle power systems and the control thereof.

BACKGROUND

A proton exchange membrane fuel cell may be used to power a vehicle. The reaction in such a fuel cell involves hydrogen molecules splitting into hydrogen ions and electrons at the anode and causing the electrons to pass through an external load circuit to the cathode side, where protons re-combine with oxygen and electrons to form water and release heat.

SUMMARY

One embodiment is a vehicle. The vehicle is composed of a traction battery, an electric machine, a fuel cell system, and a controller. The controller is programmed to operate the fuel cell system in a specific manner while the vehicle is in a queue of vehicles at a traffic stop. Specifically, while the vehicle is not first in the queue, the fuel cell system operates in such a way that current generated by the fuel cell system does not flow to a traction battery or an electric machine. However, if the data is indicative of the vehicle being first in the queue and stopped, the controller operates the fuel cell system such that the current flows to the traction battery or electric machine.

In addition, the controller may be programmed to selectively operate the traction battery, such that current from the traction battery flows to the electric machine while the vehicle is in the queue, but not first in the queue. The traffic stop may be a traffic light, stop sign, weigh station, or intersection.

The controller is also programmed to maintain the fuel cell system off while the vehicle is in the queue, but not first in the queue. However, if the data is indicative of the vehicle being first in the queue and stopped, the controller can activate and operate the fuel cell system such that the current does not flow to the traction battery or electric machine. Furthermore, the controller can activate and operate the fuel cell system such that the current does not flow to the traction battery or electric machine, provided the fuel cell system is off and the data is indicative of the vehicle being first in the queue and stopped and a traffic light is about to turn green. The data used by the controller can originate from a remote source, such as vehicle sensor data. The present application also relates to a method and a system for implementing the aforementioned features in a vehicle.

A method for operation of a fuel cell system in a vehicle based on certain conditions is presented. When the fuel cell system is turned on and the vehicle is in a queue of vehicles at a traffic stop, but not first in the queue, the system operates in a way that current generated by the fuel cell system does not flow to a traction battery or an electric machine of the vehicle. However, when the data indicates that the vehicle is first in the queue and stopped, the system operates in a way that the current flows to the traction battery or the electric machine.

In addition, the method may involve operating the fuel cell system such that the current from the traction battery selectively flows to the electric machine while the vehicle is in the queue, but not first in the queue. If the fuel cell system is off, the method involves maintaining it off while the data indicates that the vehicle is in the queue, but not first in the queue. If the fuel cell system is off and the data indicates that the vehicle is first in the queue and stopped, and a traffic light is about to turn green, the method involves activating and operating the fuel cell system in a way that the current does not flow to the traction battery or the electric machine.

In one example aspect, a system of a vehicle comprises a controller that is programmed to operate a fuel cell system of the vehicle. If the fuel cell system is turned on and the vehicle is in a predefined traffic condition, the controller ensures that the current generated by the fuel cell system does not flow to a traction battery or an electric machine of the vehicle. When the data indicates an anticipated transition out of the predefined traffic condition, the controller operates the fuel cell system such that the current flows to the traction battery or electric machine. In addition, the controller is further programmed to operate the traction battery such that current from the traction battery selectively flows to the electric machine while the data is indicative of the vehicle being in the predefined traffic condition. The predefined traffic condition can be a traffic light, stop sign, weigh station, or intersection. Moreover, the data that triggers the controller's actions can originate from a source that is remote from the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The transportation industry is rapidly evolving. An innovation is the fuel cell electric vehicle (FCEV), which is an alternative to traditional gasoline-powered cars. FCEV's are powered by a fuel cell that converts hydrogen gas into electricity to power the electric motor. Power cycling may cause mechanical and chemical degradation of the fuel cell components due to repeated heating and cooling cycles. The internal components of the fuel cell can become chemically and mechanically stressed during the power cycles, which can affect performance over time. Power cycling can also cause the fuel cell to heat if it does not have enough time to cool down between cycles. In certain driving scenarios such as heavy traffic, stop and go traffic, and a line of vehicles in a queue, there are stop and go conditions. During stop and go conditions, the fuel cell of an FCEV may need to be power cycled every time the vehicle needs to move a short distance.

The fuel cell drivetrain can be made up of various components, including the fuel cell, traction battery, vehicle controller, and others. The vehicle controller plays a role in managing various functions of the vehicle, such as the fuel cell system, engine, and traction battery. It makes decisions based on data from sensors and inputs, and optimizes fuel efficiency, allowing for a vehicle mode of operation where the fuel cell produces enough energy to power the vehicle and recharge the traction battery, resulting in a net-energy balance of zero. Here, strategies for conserving hydrogen fuel while maintaining the lifecycle of the FCEV's fuel cell drivetrain are contemplated.

Figure 1:
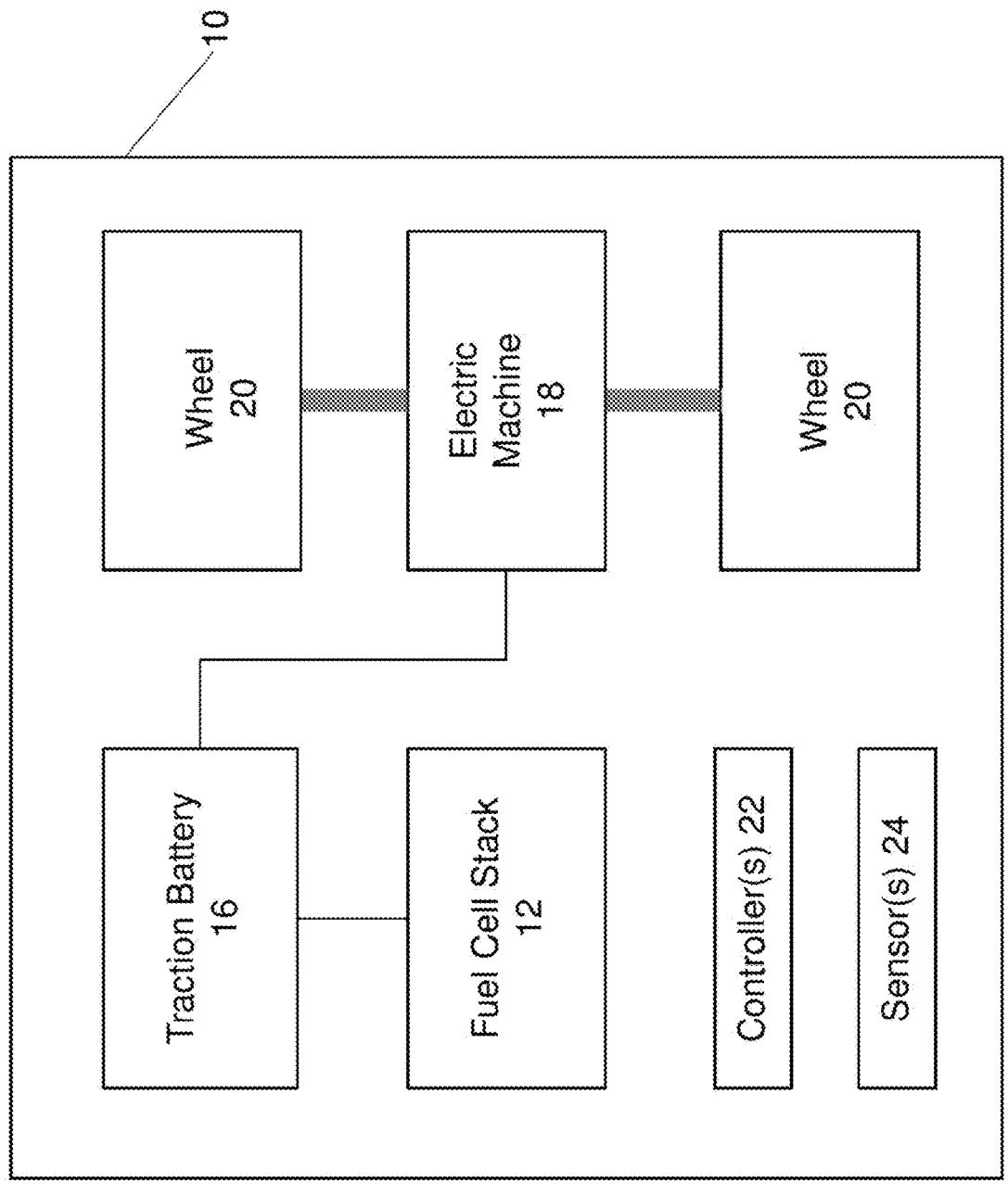
FIG. 1 is a schematic diagram of a vehicle.

Referring to FIG. 1, a vehicle 10 includes a fuel cell stack 12, which is part of the fuel cell system, a traction battery 16, an electric machine 18, wheels 20, one or more controllers 22, and may include one or more sensors 24. The fuel cell stack 12 operates by consuming hydrogen and oxygen, and producing electricity in the process. This electricity may be stored in the traction battery 16 for later use by the electric machine 18, which is arranged to transform electrical energy to mechanical energy to propel the wheels 20. The various components shown and suggested are in communication with and/or under the control of the one or more controllers 22, which can implement the algorithms contemplated herein.

When power from the fuel cell system 14 of the vehicle 10 is not required, the system 14 can choose to shut the fuel cell stack 12 down or it can command the fuel cell stack 12 into a net zero power mode for a short duration (the system can operate in this mode for extended periods). In net zero mode, the fuel cell stack 12 may be configured to produce significantly less power than in a full run mode. In full run mode, the fuel cell stack 12 is producing enough energy to power the vehicle's electric motor 18, as well as its auxiliary systems, while at the same time the energy generated by the fuel cell stack 12 is being used to recharge the vehicle's traction battery 16.

Net zero mode is a state of operation for the fuel cell stack 12 where the overall energy consumption and production of the fuel cell system 14 are balanced. The advantage of operating in net zero mode is that it conserves hydrogen fuel, as the fuel cell stack 12 is not consuming more hydrogen than is being produced, and it also extends the life of the fuel cell system by reducing the amount of stress on the components. In addition, net zero mode helps to minimize the amount of greenhouse gas emissions produced by the vehicle 10, as the fuel cell stack 12 is operating in its most efficient state. This mode of operation is typically used in fuel cell electric vehicles 10 during periods of low power demand, such as traffic scenarios. These traffic scenarios can be predefined traffic conditions such as during stop-and-go traffic or when the vehicle 10 is idling. When the power demand of the vehicle 10 increases, such as when the driver speeds up, the fuel cell system 14 will automatically switch to a different mode of operation to provide the necessary power.

In net zero mode, the fuel cell stack 12 may not produce enough power for it to flow to the traction battery 16 or the electric machine 18. However, net zero mode may be high enough to keep the fuel cell stack 12 ready to produce full power, while not using substantial amounts of fuel. Net zero mode may be achieved by reducing the amount of fuel within the fuel cell stack 12. While the vehicle is in net zero mode, the traction battery 16 may provide power to the electric machine 18.

The vehicle controller 22, also known as an electronic control unit (ECU), is a component in a fuel cell electric vehicle 10 that manages and controls various functions of the vehicle 10. A typical vehicle controller 22 consists of a processor, memory, and various input and output interfaces. The processor, typically an embedded microcontroller, is responsible for executing the control algorithms and making decisions based on the data received from the vehicle's sensors 24 and other inputs. The memory, usually in the form of flash memory or RAM, is used to store the control software and any data that the controller 22 needs to access.

The vehicle controller 22 is capable of running sophisticated software programs that control a wide range of vehicle functions, such as the fuel cell system 14, the traction battery 16, electric machine 18, and receiving inputs from the sensors 24. The software allows the controller 22 to monitor various sensors 24 and inputs, such as the fuel cell stack's temperature, the battery's voltage, and the vehicle's speed, and make decisions based on the data. For example, the controller 22 can adjust the power output of the fuel cell stack 12 to optimize fuel efficiency.

The vehicle controller 22 also receives various inputs from sensors 24 and other devices throughout the vehicle 10, such as the speed of the vehicle 10, fuel cell stack 12 pressure, temperature of the traction battery 16, and others. The controller 22 uses this information to determine the best way to operate the vehicle 10 and to make decisions about how to control the various systems. For example, the controller 22 can use data from the vehicle's speed sensor to determine the best time to switch between different modes of operation, such as net zero mode or normal operating mode.

The controller 22 plays a role in the fuel cell electric vehicle 10, serving as the brain of the vehicle's various systems. Its ability to control various functions, receive inputs from sensors, and execute sophisticated software algorithms make it a component for ensuring the vehicle 10 operates smoothly and efficiently.

The controller 22 may be configured to detect stop-and-go traffic. There could be certain scenarios during driving where there is stop and go traffic, which may be caused by a stack up of vehicles at a traffic signal, a drive thru, or in heavy traffic. During these stop-and-go conditions, turning the fuel cell stack 12 ON and OFF every time the vehicle 10 needs to move a short distance before coming to a stop may not be ideal and can affect fuel cell stack durability. Because the time it takes to restart the fuel cell stack 12 is much longer than restarting an engine, the fuel cell stack 12 might not be capable of supplementing traction battery power at the point the driver applies the pedal even if the fuel stack 12 restart is triggered on brake release. The response can thus also be sluggish because the fuel stack 12 is not immediately ready to produce power.

When in a queue of vehicles at a stop sign, the fuel cell stack 12 can be kept shut down until the vehicle 10 reaches the front of the queue. The fuel cell stack 12 can then be restarted and enter net zero power mode. At traffic lights, the time to traffic light change information can be received, for example, using vehicle to infrastructure features or detected using a sensor 24. The fuel cell stack 12 can be kept off until just before the traffic light is about to turn green. The fuel cell stack 12 can then be restarted and enter net zero power mode. For a drive thru or weight station situation, the fuel cell stack 12 can be kept shut down until the vehicle 10 reaches the front of the queue. The fuel cell stack 12 can then be restarted and enter net zero power mode.

One such scenario is a queue of vehicles at a stop sign. The controller 22 detects the queue of vehicles by using a combination of sensors 24 such as cameras, LIDAR, and radar. These sensors 24 provide the controller 22 with real-time information about the environment, including the position and speed of nearby vehicles. The controller 22 then processes this information to determine if there is a queue of vehicles at the stop sign. If so, the fuel cell stack 12 can be kept shut down until the vehicle 10 reaches the front of the queue. The fuel cell stack 12 can then be restarted and enter net zero power mode. If the vehicle 10 is in net zero power mode and is in a queue but not at the front of queue, the traction battery 16 can provide the electric machine 18 with power.

A second scenario is when the controller 22 detects a short stop at a traffic light by using a combination of various inputs to make this determination. The controller 22 takes into account the geographic location of the vehicle 10, as well as information from the traffic light itself. The light may be equipped with sensors that detect the presence of vehicles and communicate this information to the controller 22. The controller 22 also receives information from a traffic network, which includes data on traffic flow, road conditions, and other relevant information. In addition, the controller 22 uses information about the movement of other vehicles 10 at the intersection to make an informed decision about the length of the stop.

The vehicle controller 22 can be equipped with the sensors 24 such as navigation technologies to detect a short stop at a drive-thru by analyzing multiple factors such as geographic location 30, information from the traffic network, historical vehicle data, and surrounding environmental conditions. For example, if the controller 22 determines that the vehicle 10 is located near a known drive-thru establishment based on its GPS coordinates 30, it can cross-reference this information with real-time traffic data to identify any potential traffic slowdowns or bottlenecks at the drive-thru. Additionally, the controller 22 can access historical data from previous vehicles that have gone through the same drive-thru to estimate wait times and adjust its navigation route accordingly. By combining all of these sources of information, the vehicle controller 22 can make a highly informed decision about whether to enter the drive-thru or seek alternative routes to reach its destination.

The vehicle controller 22 can be equipped with various sensors 24 such as vehicle sensors and detect a short stop due to heavy traffic. The controller 22 uses geographic location data 30 to determine the current road conditions and traffic flow in the area. It also receives information from the traffic network, including real-time traffic updates, to identify any bottlenecks or slowdowns. Additionally, the controller 22 can take into account historical vehicle data, such as previous traffic patterns at the same time and location, to predict the current traffic situation. By combining all of this information, the vehicle controller 22 can accurately determine when the vehicle 10 is stopped in heavy traffic and adjust its actions accordingly. The vehicle controller 22 can also accurately determine when the vehicle 10 is in a queue or line of other vehicles.

Figure 2:
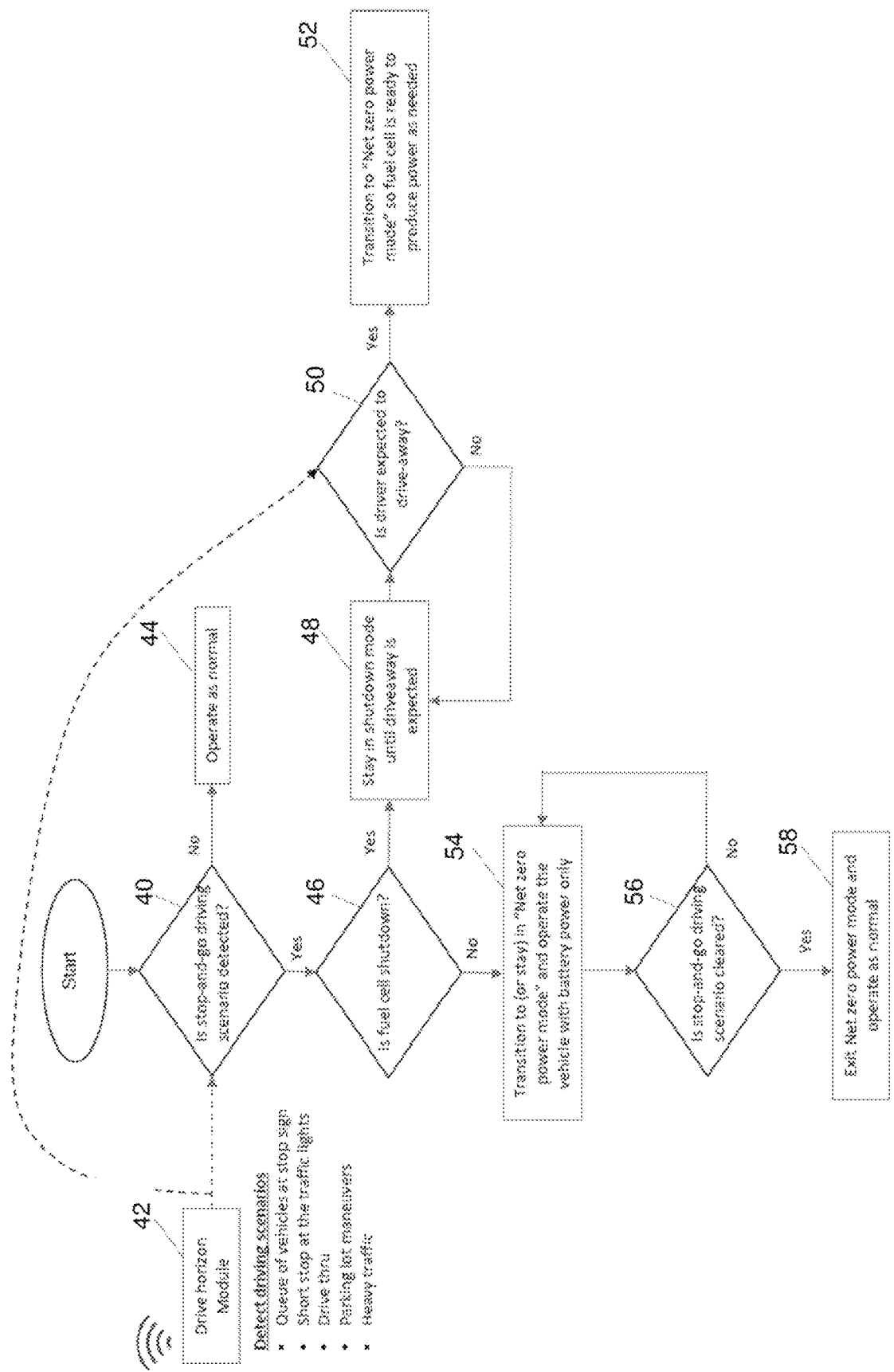
FIG. 2 is a flow chart of an algorithm for a fuel cell protocol.

Referring to FIG. 2, at decision block 40 it is determined whether a stop-and-go driving scenario is detected. A line up of vehicles, or a queue, can cause a stop-and-go scenario as the vehicle progresses through the queue until it is first in the queue. These situations can be detected using standard techniques based on data received from a cloud server via a transceiver and with the assistance of a drive horizon module 42. Brake and pedal usage information can be examined, for example, to determine whether the same are being alternately pressed a certain number of times during a predefined time period. Location information can be examined to determine whether the vehicle is near a traffic stop such as a stop sign, stop light, drive thru, in heavy traffic, or a number of other driving scenarios. If the result of decision block 40 is NO, the algorithm proceeds to operation 44 in which the fuel cell system continues to operate as normal. The normal operation may be a full run mode, where the fuel cell system can provide power to an electric machine or a traction battery.

If stop-and-go driving is detected, and the result of decision block 40 is YES, the algorithm proceeds to decision block 46. In block 46 it is determined whether the fuel cell system is shut down using standard sensors and feedback data. If the result of decision block 46 is YES, the algorithm proceeds to operation 48 in which the fuel cell system stays in shut down mode. At decision block 50, it is determined whether the driver is expected to drive away using standard techniques. Data indicating the driver has removed their foot from the brake pedal can be used as a trigger condition indicating the driver is expected to drive away. Vehicle to infrastructure data, and other data, can also be used to determine whether the driver is expected to drive away. If the data is indicating that the vehicle is finally first in a queue at a stop sign, it can be determined that the driver is expected to drive away. If the result of decision block 50 is YES, the algorithm proceeds to operation 52 in which the fuel cell system transitions to net zero power mode. In net zero mode, the fuel cell stack system may not produce enough power to supply other vehicle systems but may keep the fuel cell system ready to produce full power. If the result of decision block 50 is NO, the algorithm returns to operation 48 and the fuel cell stays shut down until drive away is expected.

If the result of operation 46 is NO, the algorithm proceeds to operation 54 in which the fuel cell system transitions to net zero power mode and operates the vehicle with traction battery power only. At decision block 56, it is determined whether the stop-and-go driving scenario has cleared, for example, using the standard techniques and data mentioned above. If the result of decision block 56 is NO, the algorithm returns to operation 54. If the result of decision block 56 is YES, the algorithm proceeds to operation 58 in which the fuel cell system exits net zero power mode and operates in full run mode. In full run mode the fuel cell system produces enough power to supply other systems of the vehicle.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a traction battery;
an electric machine;
a fuel cell system; and
a controller programmed to,
provided the fuel cell system is on, operate the fuel cell system such that current generated by the fuel cell system does not flow to the traction battery or the electric machine while data is indicative of the vehicle being stopped in a queue of vehicles at a traffic stop, but not first in the queue, and responsive to the data being indicative of the vehicle being first in the queue and stopped, operate the fuel cell system such that the current generated by the fuel cell system flows to the traction battery or the electric machine, and
provided the fuel cell system is off, maintain the fuel cell system off while the data is indicative of the vehicle being stopped in a queue, but not first in the queue.

2. The vehicle of claim 1, wherein the controller is further programmed to operate the traction battery such that current from the traction battery selectively flows to the electric machine while the data is indicative of the vehicle being stopped in the queue, but not first in the queue.

3. The vehicle of claim 1, wherein the traffic stop is traffic light, stop sign, weigh station, or intersection.

4. The vehicle of claim 1, wherein the controller is further programmed to, provided the fuel cell system is off and responsive to the data being indicative of the vehicle being first in the queue and stopped, activate and operate the fuel cell system such that the current generated by the fuel cell system does not flow to the traction battery or the electric machine.

5. The vehicle of claim 1, wherein the controller is further programmed to, provided the fuel cell system is off and responsive to the data being indicative of (i) the vehicle being first in the queue and stopped and (ii) a traffic light is about to turn green, activate and operate the fuel cell system such that the current generated by the fuel cell system does not flow to the traction battery or the electric machine.

6. The vehicle of claim 1, wherein the data originates from a source remote from the vehicle.

7. The vehicle of claim 1, wherein the data is vehicle sensor data.

8. A method comprising:
provided a fuel cell system of a vehicle is on, operating the fuel cell system such that current generated by the fuel cell system does not flow to a traction battery or electric machine of the vehicle while data is indicative of the vehicle being stopped in a queue of vehicles at a traffic stop, but not first in the queue, and responsive to the data being indicative of the vehicle being first in the queue and stopped, operating the fuel cell system such that the current generated by the fuel cell system flows to the traction battery or the electric machine; and
provided the fuel cell system is off, maintaining the fuel cell system off while the data is indicative of the vehicle being stopped in the queue, but not first in the queue.

9. The method of claim 8 further comprising operating the fuel cell system such that the current from the traction battery selectively flows to the electric machine while the data is indicative of the vehicle being stopped in the queue, but not first in the queue.

10. The method of claim 8 further comprising, provided the fuel cell system is off and responsive to the data being indicative of (i) the vehicle being first in the queue and stopped and (ii) a traffic light is about to turn green, activating and operating the fuel cell system such that the current generated by the fuel cell system does not flow to the traction battery or the electric machine.

11. A system of a vehicle comprising:
a controller programmed to,
provided a fuel cell system of the vehicle is on, operate the fuel cell system such that current generated by the fuel cell system does not flow to a traction battery or electric machine of the vehicle while data is indicative of the vehicle being stopped in a queue of vehicles at a traffic stop, but not first in the queue, and responsive to the data being indicative of the vehicle being first in the queue and stopped, operate the fuel cell system such that the current generated by the fuel cell system flows to the traction battery or the electric machine, and
provided the fuel cell system is off, maintain the fuel cell system off while the data is indicative of the vehicle being stopped in the queue, but not first in the queue.

12. The system of claim 11, wherein the controller is further programmed to operate the traction battery such that current from the traction battery selectively flows to the electric machine while the data is indicative of the vehicle being stopped in the queue, but not first in the queue.

13. The system of claim 11, wherein the traffic stop is a traffic light, stop sign, weigh station, or intersection.

14. The system of claim 13, wherein the data originates from a source remote from the vehicle.

* * * * *